UNITED STATES PATENT OFFICE.

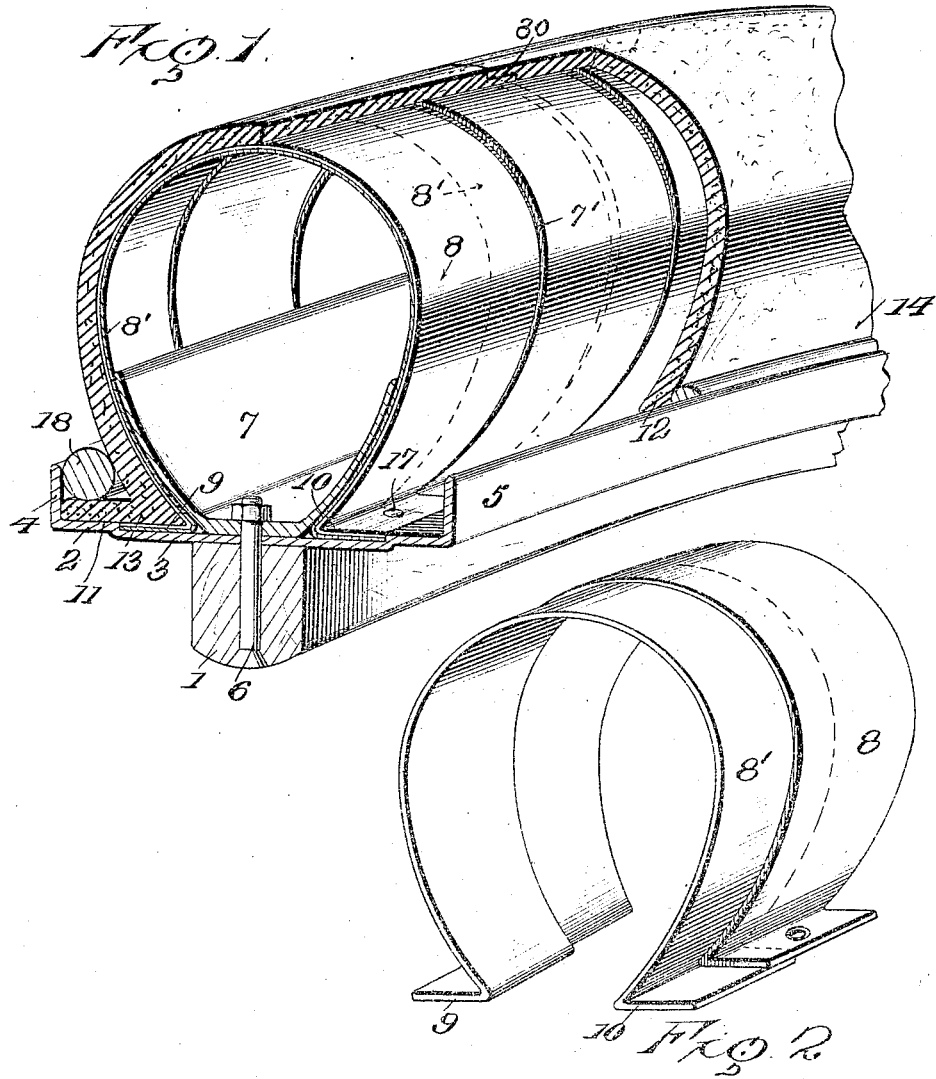

MILTON J. ALTLAND, OF DILLSBURG, PENNSYLVANIA; CHARLES ALTLAND ADMINISTRATOR OF SAID MILTON J. ALTLAND, DECEASED.

CUSHION-TIRE.

1,005,589.  Specification of Letters Patent.  Patented Oct. 10, 1911.

Application filed March 12, 1910. Serial No. 548,840.

*To all whom it may concern:*

Be it known that I, MILTON J. ALTLAND, a citizen of the United States, residing at Dillsburg, in the county of York and State of Pennsylvania, have invented certain new and useful Improvements in Cushion-Tires, of which the following is a specification, reference being had therein to the accompanying drawing.

My invention relates to improvements in cushion tires, and pertains particularly to automobile tires.

The object of my invention is to provide a spring tire having a rubber covering having certain details of structure hereinafter more fully set forth.

In the accompanying drawings—Figure 1 is a sectional perspective view of my improved tire. Fig. 2 is a perspective view of the springs.

Referring now to the drawings, 1 represents the ordinary felly used on a vehicle of the character to which my improved tire is to be attached. Secured to the felly in any desirable and practical manner and especially in the manner ordinarily used, is a pressed steel rim 2, which has a central depressed portion 3, and the outer upwardly turned edges 4 and 5. This, as shown, forms a channel rim. Secured by the same bolts 6, that secure the rim 2 to the felly 1, is a pressed steel channel rim 7, which is approximately semi-circular in cross-section.

The springs 8 forming the body portion of my improved tire, consist of circular wide springs having at their lower ends the laterally extending ends 9 and 10, which fit into the depressed portion 3, and have their upper faces flush with the horizontal face 11, of the rim 2. By this structure, it will be seen that a flat smooth surface is provided for the free ends 12 and 13 of the rubber covering 14. The springs are formed of outer springs 8 having a slight space between the outer edges thereof and said space 7' closed by the inner springs 8', whereby the space provides for slight movement of the outer and inner springs. In order to prevent any movement of the ends 9 and 10 of the springs, each end is bolted to the steel rim by a bolt 17. The free ends 12 and 13 of the covering 14, as shown, rest upon the free ends of the spring and the flat upper surfaces of the steel rim 2. In order to hold the covering in said position, I provide a steel band or wire 18, which rests upon the ends of the covering between the covering 14 and the upwardly turned ends of the rim 2. These wires 18 have their ends welded together or may have some detachable fastening means whereby the wires tightly clamp the tire covering on the spring, and it is rigidly held against displacement. The inner rim 7, as shown, strengthens the springs and prevents the same from collapsing.

In the form of tire shown, it will be seen that the outer covering can readily be removed by removing the wires 18 and thus exposing the springs for replacing the same should they become broken or otherwise injured or disconnected.

The covering can be made of an endless form as the ordinary clencher tire, but it has been found that the tire can be made with two ends mortised as indicated at 30, whereby a smooth outer surface is produced. The mortised ends can either be cemented or vulcanized together.

Having thus described my invention, what I claim and desire to secure by Letters Patent is—

1. In a vehicle wheel, comprising a rim, an outwardly extending central portion secured to the rim, springs extending around said central portion and having laterally turned ends resting in a depressed portion of the rim to bring the outer face of the ends flush with the outer face of the rim, a covering for said springs, and having laterally turned ends resting upon the outer face of the ends of the spring and rim, and means for securing the laterally turned ends of the covering on the rim.

2. In a vehicle wheel, comprising a rim, springs having laterally turned ends resting in a central depressed portion in the rim and secured therein, a covering for the springs and having laterally turned ends resting upon the lateral ends of the springs and the outer face of the rim, and bands encircling the rim upon the outer face of the laterally turned ends of the covering and securing the covering to the rim.

3. In a vehicle wheel, comprising a rim having a central depressed portion and outwardly turned ends, an outwardly extending member secured to the rim at the center of said depressed portion, springs extending around said member and laterally turned ends resting in the depressed portion, rivets or bolts securing the laterally turned ends of the springs in said portion, a covering encircling the springs and having laterally turned ends resting upon the outer face of the laterally turned ends of the springs and the rim, encircling clenching members on the laterally turned ends of the covering and held against outward movement by the outwardly turned ends of the rim.

In testimony whereof I hereunto affix my signature in the presence of two witnesses.

MILTON J. ALTLAND.

Witnesses
  M. B. EBY,
  J. W. BAILEY.